(12) United States Patent
Testa

(10) Patent No.: US 12,485,969 B2
(45) Date of Patent: Dec. 2, 2025

(54) FRONT FRAME ASSEMBLY WITH SUSPENSION ATTACHMENT STRUCTURE FOR A MOTOR VEHICLE

(71) Applicant: FERRARI S.P.A., Modena (IT)

(72) Inventor: Daniele Testa, Modena (IT)

(73) Assignee: FERRARI S.P.A., Modena (IT)

( * ) Notice: Subject to any disclaimer, the term of this patent is extended or adjusted under 35 U.S.C. 154(b) by 409 days.

(21) Appl. No.: 18/171,904

(22) Filed: Feb. 21, 2023

(65) Prior Publication Data

US 2023/0264745 A1    Aug. 24, 2023

(30) Foreign Application Priority Data

Feb. 24, 2022  (IT) .......................... 102022000003407

(51) Int. Cl.
*B62D 25/08* (2006.01)
*B62D 21/15* (2006.01)

(52) U.S. Cl.
CPC ......... *B62D 21/152* (2013.01); *B62D 25/085* (2013.01)

(58) Field of Classification Search
CPC .... B62D 21/152; B62D 25/08; B62D 25/082; B62D 25/085; B62D 25/2018; B62D 25/2045; B62D 25/088
USPC .. 296/198, 203.01, 2, 193.09, 187.09, 187.1
See application file for complete search history.

(56) References Cited

U.S. PATENT DOCUMENTS

2012/0248820 A1   10/2012   Yasui et al.

FOREIGN PATENT DOCUMENTS

| FR | 2962390 A1 | * | 1/2012 | ............. B60R 19/34 |
| JP | S63145770 U | | 9/1988 | |
| JP | 2001113923 A | * | 4/2001 | |
| JP | 2020019308 A | | 2/2020 | |

OTHER PUBLICATIONS

FR2962390 Text (Year: 2012).*
JP2001113923 Text (Year: 2001).*
Italian Search Report for Application No. 102022000003407; Filing Date—Feb. 24, 2022; Date of Mailing—Sep. 15, 2022, 15 pages.
Lotus Cars Ltd: "Lotus Service Notes Front Suspension", Mar. 1, 1998 (Mar. 1, 1998), XP055961083, Retrieved from the Internet: URL:https://cardiagn.com/lotus-elise-works-hop-manual-pdf/ [retrieved on Sep. 14, 2022] 11 pages.

* cited by examiner

*Primary Examiner* — Dennis H Pedder
(74) *Attorney, Agent, or Firm* — CANTOR COLBURN LLP

(57) ABSTRACT

A front frame assembly for a motor vehicle includes a suspension attachment structure with an attachment portion fixable to a body cell of the motor vehicle, one or more attachment elements fixed relative to the suspension attachment structure to allow a suspension of the motor vehicle to be coupled to the attachment portion, and an absorption element to absorb a front crash of the motor vehicle, wherein the absorption element is distinct from the suspension attachment structure, is fixed relative to the suspension attachment structure, and extends along a first straight axis, wherein the suspension attachment structure further comprises a collapsible portion between the absorption element and the attachment portion along the first straight axis, the collapsible portion having a first compression stiffness equal to or greater than a second stiffness of the absorption element and smaller than a third stiffness of the attachment portion.

15 Claims, 2 Drawing Sheets

FRONT FRAME ASSEMBLY WITH SUSPENSION ATTACHMENT STRUCTURE FOR A MOTOR VEHICLE

CROSS-REFERENCE TO RELATED APPLICATIONS

This patent application claims priority from Italian Patent Application no. 102022000003407 filed on Feb. 24, 2022, the entire disclosure of which is incorporated herein by reference.

TECHNICAL FIELD

The invention relates to a front frame assembly comprising a suspension attachment structure for a motor vehicle, particularly for a sports motor vehicle.

PRIOR ART

As is known, the front frame of a motor vehicle serves both to support body elements, i.e., external cladding plates, such as the bumper or bonnet, or various connection brackets, and to absorb front crashes, that is, crashes in the forward moving direction of the motor vehicle.

In particular, to absorb a front crash, the frame specifically includes an absorption box, also known as a "crash box" in English, which includes a pair of spars which extend parallel to the forward moving direction.

In some cases, the spars extend, in particular directly, from a suspension attachment structure, also known as a "shock tower" in English, including the attachments for the suspension of the motor vehicle.

While the suspension attachment structure is rigid, the spars are deformable along the forward moving direction under compression forces.

The deformability of the spars ensures that the absorption box gradually deforms in the event of a front crash. In other words, in response to the front crash, the speed of the motor vehicle goes from a high value to zero progressively, i.e., according to a finite deceleration, while the spars deform and absorb the energy of the crash.

In general, ideally, the desired deceleration would be as low as possible in order to improve the sensations and safety of the passengers in the motor vehicle.

On the other hand, decreasing the deceleration means increasing the length of the spars along the forward moving direction, which contrasts with the need for both space saving and style.

In the light of the above, there is a need to improve the known motor vehicles, in particular by finding a good compromise between limiting an increase in the length of the spars along the forward moving direction and increasing the progressiveness of shock absorption or reducing the deceleration of the motor vehicle due to the crash.

The object of the invention is to meet at least one of the above needs, preferably in a simple and reliable way.

DESCRIPTION OF THE INVENTION

The object is achieved by means of a front frame assembly for a motor vehicle as defined in claim 1.

The dependent claims define particular embodiments of the invention.

BRIEF DESCRIPTION OF THE DRAWINGS

To better understand the invention, one embodiment thereof is described hereinafter by way of non-limiting example and with reference to the accompanying drawings, wherein.

EMBODIMENTS OF THE INVENTION

Figure 1:
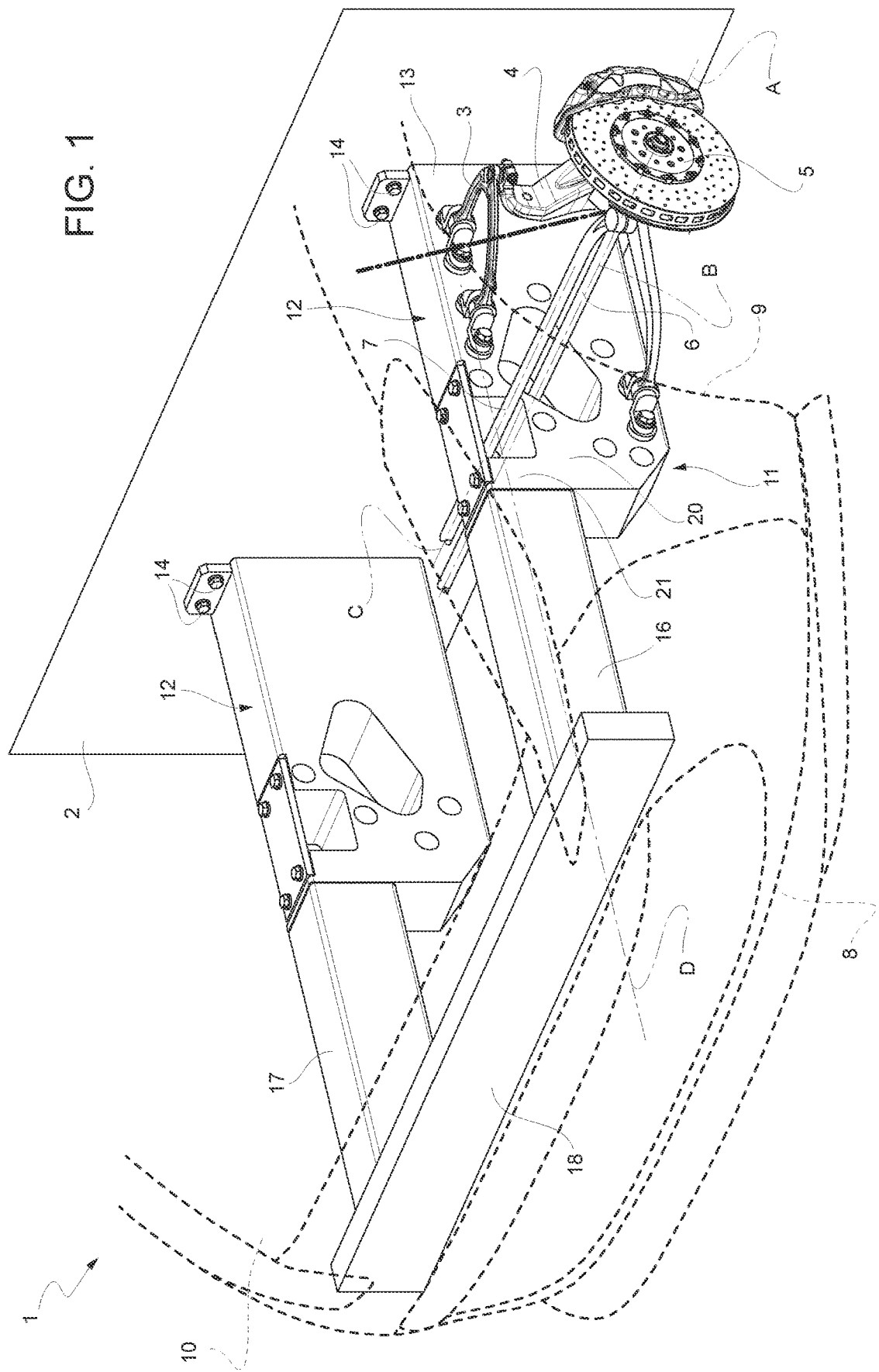
FIG. 1 is a schematic perspective view of a front portion of a motor vehicle comprising a frame assembly according to the invention.

In FIG. 1, reference number 1 is used to indicate a motor vehicle as a whole.

Like all motor vehicles, the motor vehicle 1 has a normal forward moving direction and includes a passenger compartment to accommodate at least one driver and possibly one or more passengers.

The motor vehicle 1 comprises a body cell 2 which defines or surrounds the passenger compartment. For example, the body cell 2 may be monolithic. In addition, the body cell can comprise or be made of carbon fibre.

The motor vehicle 1 further comprises at least one, some or all of the typical components such as a suspension 3, a knuckle 4, a wheel hub 5, an axle shaft 6, and a steering gear or steering box 7.

The wheel hub 5 has a portion that is fixed relative to the knuckle 4 and a portion that can rotate around an axis A transversal to the forward moving direction.

The fixed portion is carried by the knuckle 4, whereas the rotating portion is coupled to the axle shaft 6 so that it can be driven into rotation by the latter.

The axle shaft 6 extends along a straight axis B parallel to, but not necessarily coincident with, the axis A.

The steering box 7 extends along a further straight axis C parallel to the axes A, B, or transversal and more precisely orthogonal to the forward moving direction.

The steering box 7 is a well-known device coupled to the wheel hub 5 with the function of steering the fixed portion of the wheel hub 5, in particular transforming a rotary movement of a steering wheel (not shown) of the motor vehicle 1 into a straight movement along the axis C useful for steering the fixed portion of the wheel hub 5.

In fact, the steering box 7 is more generally part of a steering unit of the motor vehicle 1, also including, for example, the steering wheel and configured to steer the fixed portion of the wheel hub 5.

The steering box 7 comprises a steering rod coupled to the knuckle 4 or wheel hub 5 in a known manner and a transmission configured to transmit the rotation of the steering wheel to the steering rod, such that the steering rod translates in response to the rotation of the steering wheel.

For example, the transmission may include a rack-and-pinion mechanism of a known type, not shown, in which a pinion coupled to the steering wheel engages with a rack fixed to the steering rod; the rack translates along the axis C in response to the rotation of the pinion, which is in turn caused by the steering wheel via a further transmission of a known type, not shown.

In FIG. 1, the steering rod is the only illustrated component of the steering box 7.

Moreover, the motor vehicle 1 comprises a front frame assembly 11, in particular fixed relative to the body cell 2 and serving, for example, to support body elements of the motor vehicle 1, i.e., external panels or plates, such as a bumper 8, a wing 9, a bonnet 10, and the like.

The assembly 11 comprises a suspension attachment structure 12, alternately referred to as a "shock tower" in English.

More precisely, the assembly 11 comprises two suspension attachment structures or bodies 12 arranged at the lateral ends of the body cell 2, in a horizontal direction orthogonal to the forward moving direction.

The structures 12 extend parallel to each other along respective axes D parallel to the forward moving direction.

The structures 12 extend in a projecting manner relative to the body cell 2. More precisely, the structures 12 protrude along the axes D from the body cell 2, in particular directly from the body cell 2.

The structures 12 are preferably identical to each other. For this reason, only one of the structures 12 will be described in detail by the following description, it being understood that each of the features described for one of the structures 12 is also applicable to the other of the structures 12. Thus, the term "structure 12" may indifferently refer to any of the structures 12.

The structures 12 could also possibly be considered as one structure 12.

The structure 12 has an attachment portion 13, which is fixed relative to the body cell 2 or fixed thereto, for example by means of releasable fastening devices 14, in particular comprising threaded members such as bolts.

The structure 12 serves to support the suspension 3. In fact, the assembly 11 also comprises a plurality of attachment elements or attachments 15 (FIG. 2) configured to allow the suspension 3 to be coupled to the attachment portion 13.

Some of the attachments 15 are located at the attachment portion 13, although this does not exclude that other attachments 15 may be located at other portions of the structure 12.

In addition, the attachments 15 can be part of the structure 12.

The structure 12 or rather each of the structures 12 can preferably be a single piece, for example made using a casting technique or more precisely a die casting technique.

The suspension 3 carries the knuckle 4 and is coupled to the attachment portion 13 through the attachments 15, in particular in a movable manner relative to the structure 12. In turn, the knuckle 4 is movable relative to the suspension 3.

The assembly 11 comprises at least one absorption element 16 to absorb a front crash of the motor vehicle 1. The absorption element 16 comprises, or rather is, a spar, i.e., a beam, in particular a box-shaped one, extending parallel to the forward moving direction of the motor vehicle 1.

The element 16 is distinct from the structure 12 and is fixed relative to it, i.e., it is fixed to it.

The element 16 extends along the straight axis D parallel to the forward moving direction of the motor vehicle 1.

The element 16 extends from the structure 12, i.e., it protrudes in a cantilever manner relative to the structure 12, in particular towards the bumper 8. Specifically, the element 16 extends directly from the structure 12, i.e., it protrudes directly from it.

Indeed, the assembly 11 also comprises another absorption element 17, preferably identical to the previous one and protruding parallel to the axis D from the other structure 12, which is not described in detail.

Moreover, the assembly 11 comprises a third absorption element 18 to absorb a front crash of the motor vehicle 1. The absorption element 18 comprises, or rather is, a crossbar, i.e., a beam, in particular a box-shaped one, extending transversally and more precisely orthogonally to the forward moving direction of the motor vehicle 1, in particular horizontally.

The element 18 has two ends 18*a*, 18*b* fixed to the elements 16, 17 respectively at their corresponding ends opposite to the structure 12 or body cell 2 in relation to the axis D.

The elements 16, 17, 18 are individually part of an absorption box of the assembly 11; the absorption box is alternately referred to as a "crash box" in English.

The structure 12 further comprises a collapsible portion located between the element 16 and the attachment portion 13 along the axis D.

More precisely, the collapsible portion 20 extends along a direction orthogonal to the axis D and the axis C, i.e., a direction from top to bottom, throughout the length of the structure 12 along the same direction. In other words, the collapsible portion 20 has a length along the latter direction equal to the length of the structure 12 along the same direction.

Furthermore, in particular, the collapsible portion 20 is adjacent to the element 16 along the axis D. In other words, the element 16 extends in a cantilever manner from the collapsible portion 20, more particularly directly in a cantilever manner from the collapsible portion 20.

Some of the attachments 15 are optionally arranged at the collapsible portion 20.

Preferably, the structure 12 consists of the portions 13, 20, and possibly also of the attachments 15.

The collapsible portion 20 is less stiff to compression than the attachment portion 13. In other words, the collapsible portion 20 has a lower compression stiffness than the attachment portion 13.

In addition, the collapsible portion 20 has a compression stiffness equal to or greater than that of the element 16, although this is not strictly necessary. In fact, according to alternative embodiments, the collapsible portion 20 may be less stiff to compression than the element 16.

In particular, the collapsible portion 20 has a compressive strength defined by a compressive breaking stress of any value in the range of 140 kN to 200 kN, preferably 160 kN to 180 kN.

Moreover, in greater detail, the length of the collapsible portion 20 along the axis D is less than half of the overall length of the structure 12 along the axis D, i.e., the distance between the element 16 and the body cell 2.

More precisely, the length of the collapsible portion 20 along the axis D is less than three-fifths of the overall length of the structure 12 along the axis D.

In particular, the collapsible portion 20 is such that a maximum deceleration of the motor vehicle 1 along the axis D is equal to any value in the range of 15 G to 25 G.

The collapsible portion 20 has an end 21, in particular an upper end, in relation to a vertical axis H, i.e., orthogonal to both the axes D and C. The end 21 has a recess or cavity 22 extending in depth along the axis H.

The recess 22 accommodates the steering box 7 or more precisely the steering rod. In other words, the steering box 7, or more precisely the steering rod, crosses the structure 12 through the recess 22, i.e., it crosses or extends through the recess 22 along the axis C.

The recess 22 is open along the axis H, in particular upwards. In other words, the recess 22 has a mouth opening, i.e., an upper end, extending transversally to the axis H.

The recess 22 is U-shaped or concave in relation to the axis H, in particular upwards.

In relation to the axis C, the recess 22 extends throughout the length or width of the collapsible portion 20 along the axis C, i.e., at the recess 22 itself.

Preferably, the recess 22 has a depth along the axis H that is greater than at least one third of the overall length of the collapsible portion 20 along the axis H.

Also, conveniently, the recess 22 has a length parallel to the axis D greater than at least one third or more preferably at least half of the overall length of the collapsible portion 20 along the axis D.

Alternatively, the ratio between the maximum length of the recess 22 parallel to the axis D and the overall length of the structure 12 along the axis D is equal to any value between $1/15$ and $1/3$.

Therefore, due to and at the recess 22, the collapsible portion 20 has a cross-section in relation to the axis D that is weakened compared to any cross-section of the attachment portion 13 in relation to the same axis D.

Therefore, in this respect, the collapsible portion 20 is generally weakened compared to the attachment portion 13. This is the reason for the lower compression stiffness of the collapsible portion 20 compared to the attachment portion 13.

Conveniently, the collapsible portion 20 can be further weakened, for example because the collapsible portion 20 comprises one or more holes 23 extending transversely to both the axes D, H, e.g., parallel to the axis C. In other words, the holes 23 extend along respective directions transversal to both the axes D, H or parallel to the axis C.

Optionally, the holes 23 are substantially aligned with the recess 22 along the axis H. Here, the term substantially indicates that at least one axis parallel to the axis H extends within the recess 22 and simultaneously intersects or is tangent to one of the holes 23.

Each of the holes 33 can optionally be a through hole of the collapsible portion 20.

Preferably, the recess 22 is aligned with the first axis D. That is, the axis D extends within the recess 22. For the sake of clarity, it is recalled here that the axis D is the axis of the beam or spar defining the element 16.

Advantageously, the assembly 11 further comprises an absorber body 24 and releasable fixing devices 25 which fix the absorber body 24 to the collapsible portion 20 in a releasable manner.

In greater detail, the releasable fixing devices 25 comprise threaded elements or a fixing interface coupled to the collapsible portion 20 in a fixed manner relative thereto. Specifically, the threaded elements comprise threaded holes obtained in the collapsible portion 20 and respective screws which can be screwed into the threaded holes. In particular, the threaded holes extend parallel to the axis H.

The absorber body 24 comprises or rather is a plate preferably having a thickness of less than 20 mm, more preferably less than 10 mm.

The absorber body 24 is fixed to the collapsible portion at the recess 22.

More precisely, the absorber body 24 covers or defines a cover for the mouth opening of the recess 22 in the direction of the axis H.

In practice, the absorber body 24 is arranged over the recess 22.

The absorber body 24 extends parallel to the axis D with a greater length than that of the recess 22 along the same axis D.

Figure 2:
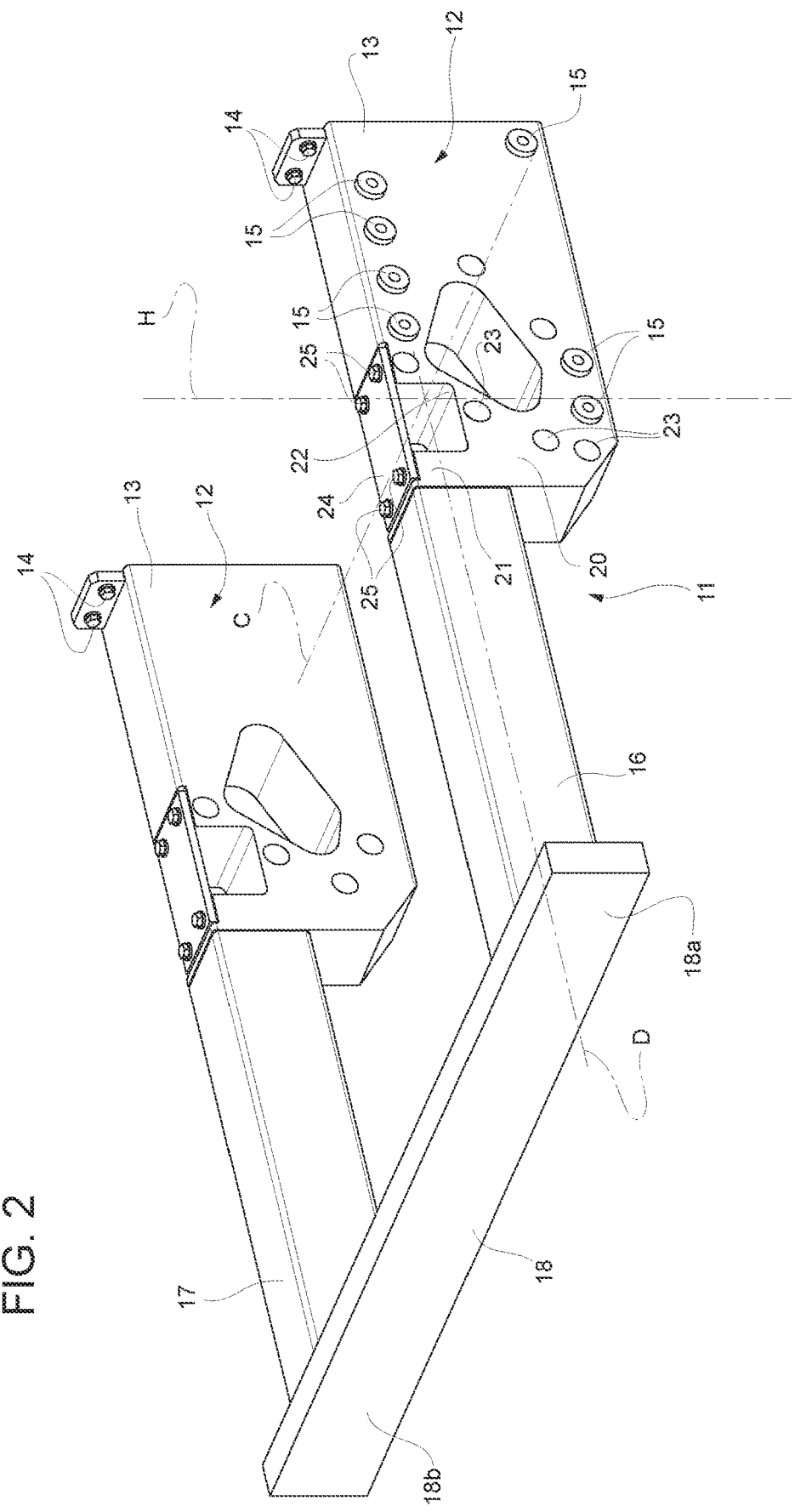
FIG. 2 is a schematic perspective view of the frame assembly.

In the embodiment in FIG. 2, the absorber body 24 completely covers the recess 22 or its mouth opening, in particular from above.

The thickness of the plate of the absorber body 24 or defining the absorber body 24 is directed along the axis H.

Actually, preferably, the assembly 11 could comprise a plurality of absorber bodies, possibly comprising or defined by respective plates, all distinct from each other, for example in their thickness or shape.

The plurality of bodies includes or comprises the absorber body 24, whereas the other bodies of the plurality are not shown.

The fixing devices 25 are configured to releasably fix each of the plurality of absorber bodies to the collapsible portion 20 in the same position in which the absorber body 24 is fixed, after said absorber body 24 has been released and removed from its position, that is, removed from the structure 12.

However, this is not limiting, as other fixing devices distinct from the fixing devices 25 could be used to fix each of the other absorber bodies not shown.

Therefore, the absorber body 24 may be replaced by any of the other absorber bodies, which might not actually be fitted to the motor vehicle 1 or fixed to the structure 12.

Rather, the plurality of absorber bodies forms a set of interchangeable components or bodies with different stiffness and deformability.

Optionally, the absorber bodies may be provided in a kit and/or identified by means of identification signs that are distinct from each other, for example acronyms or colours.

The advantages of the assembly 11 according to the invention are clear from the foregoing.

In fact, the lower compression stiffness of the collapsible portion 20 compared to the attachment portion 13 adds to the structure 12, which is typically rigid according to the prior art, properties of deformability and therefore of absorption of front crashes.

In this way, the collapsible portion can cooperate with the element 16 in absorbing front crashes, so the element 16 does not need to be extended along the axis D.

Therefore, the assembly 11 can be compact along the forward moving direction of the motor vehicle, thus meeting the style requirements and also achieving an excellent compromise between the progressiveness of shock absorption and the overall dimensions.

In addition, the absorber body 24 or even better the plurality of absorber bodies ensures an adjustment or calibration of the overall stiffness or deformability of the assembly 11, in particular through the selection of the thickness or shape of the plates of the absorber bodies or defining the absorber bodies.

Lastly, it is clear that modifications and variations may be made to the assembly 11 according to the invention, without however departing from the scope of protection defined by the claims.

In particular, the number and shape of the components described and illustrated herein could be different, and in particular varied with great freedom.

Furthermore, each range described herein is to be construed as a plurality of individual alternative values.

Each individual numeric value within the range shall be considered as specifically described even if not explicitly mentioned.

Finally, the term collapsible should be understood relative to the attachment portion 13, in particular with the meaning of more collapsible than the attachment portion 13, it being understood that a preferred material for the collapsible portion 20 is a ductile material, such as for example aluminium or steel.

The invention claimed is:

1. A front frame assembly (11) for a motor vehicle (1), the front frame assembly (11) comprising
   a suspension attachment structure (12) comprising an attachment portion (13) fixable to a body cell (2) defining a passenger compartment of the motor vehicle (1),
   one or more attachment elements (15) fixed relative to the suspension attachment structure (12) and configured to allow a suspension (3) of the motor vehicle (1) to be coupled to the attachment portion (13), and
   an absorption element (16) to absorb a front crash of the motor vehicle (1), the absorption element (16) being distinct from the suspension attachment structure (12), being fixed relative to the suspension attachment structure (12) and extending along a first straight axis (D), characterized in that the suspension attachment structure (12) further comprises a collapsible portion (20) located between the absorption element (16) and the attachment portion (13) along the first straight axis (D), the collapsible portion (20) having a first compression stiffness that is equal to or greater than a second compression stiffness of the absorption element (16) and smaller than a third compression stiffness of the attachment portion (13).

2. The assembly according to claim 1, wherein the collapsible portion (20) has an end (21) along a second axis (H) orthogonal to the first axis (D), the end (21) having a recess (22) extending in depth along the second axis (H) and configured to be crossed by a steering box (7) of the motor vehicle (1) along a third axis (C) orthogonal to both the first and the second axis (D, H).

3. The assembly according to claim 2, wherein the recess (22) is aligned with the first axis (D).

4. The assembly according to claim 2, further comprising an absorber body (24) and releasable fixing means (25) fixing the absorber body (24) to the collapsible portion (20) in a releasable manner.

5. The assembly according to claim 4, wherein the absorber body (24) is fixed to the collapsible portion (20) at the recess (22).

6. The assembly according to claim 5, wherein the absorber body (24) is fixed to the collapsible portion (20) so as to cover a mouth opening of the recess (22) in the direction of the second axis (H), the mouth opening extending crosswise to the second axis (H).

7. The assembly according to claim 4, wherein the absorber body (24) comprises or is defined by a plate.

8. The assembly according to claim 4, further comprising a plurality of absorber bodies, all distinct from one another, the plurality of absorber bodies including said absorber body (24), wherein the releasable fixing means (25) are configured to fix, in a releasable manner, each one of the absorber bodies to the collapsible portion (20) in a same position in which said absorber body (24) is fixed, after said absorber body (24) has been released and removed from said position.

9. The assembly according to claim 2, comprising one or more holes (23) extending along respective directions transversal to both the first and the second axis (D, H) as well as substantially aligned with the recess (22) along the second axis (H).

10. The assembly according to claim 1, wherein the absorption element (16) comprises or is defined by a spar.

11. The assembly according to claim 1, wherein the suspension attachment structure (12) is a single piece.

12. A motor vehicle (1) comprising
    a passenger compartment,
    a body cell (2) defining the passenger compartment,
    a suspension (3), and
    a front frame assembly (11) according to claim 1,
        wherein the attachment portion (13) of the front frame assembly (11) is fixed to the body cell (2), and
        wherein the suspension (3) is coupled to the attachment elements (15), the first axis (D) being parallel to the forward moving direction of the motor vehicle (1).

13. The motor vehicle according to claim 12, wherein the collapsible portion (20) of the suspension attachment structure (12) of the front frame assembly (11) has an end (21) along a second axis (H) orthogonal to the first axis (D), the end (21) having a recess (22) extending in depth along the second axis (H) and configured to be crossed by a steering box (7) of the motor vehicle (1) along a third axis (C) orthogonal to both the first and the second axis (D, H), the motor vehicle (1) further comprising a steering box (7) arranged through the recess (22) along the third axis (C).

14. The assembly according to claim 7, wherein the plate has a thickness that is smaller than 20 mm.

15. The assembly according to claim 1, wherein the suspension attachment structure (12) is manufactured by means of die casting.

* * * * *